United States Patent
Oroskar et al.

(10) Patent No.: US 10,149,225 B1
(45) Date of Patent: Dec. 4, 2018

(54) SYSTEMS AND METHODS FOR EXCLUDING RELAY NODES FROM MULTI-USER MULTIPLE-INPUT-MULTIPLE-OUTPUT (MU-MIMO) PAIRING

(71) Applicant: Sprint Spectrum LP, Overland Park, KS (US)

(72) Inventors: Siddharth Oroskar, Overland Park, KS (US); Jasinder Singh, Olathe, KS (US); Nitesh Manchanda, Overland Park, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 85 days.

(21) Appl. No.: 15/082,258

(22) Filed: Mar. 28, 2016

(51) Int. Cl.
  *H04W 40/16* (2009.01)
  *H04B 7/04* (2017.01)
  *H04B 17/336* (2015.01)
  *H04W 4/80* (2018.01)
  *H04B 7/0452* (2017.01)

(52) U.S. Cl.
  CPC .......... *H04W 40/16* (2013.01); *H04B 7/0452* (2013.01); *H04B 17/336* (2015.01); *H04W 4/80* (2018.02)

(58) Field of Classification Search
  CPC .... H04W 40/16; H04W 4/008; H04B 17/336; H04B 7/0452
  See application file for complete search history.

(56) References Cited

U.S. PATENT DOCUMENTS

| | | | |
|---|---|---|---|
| 8,520,616 B2 | 8/2013 | Cui et al. | |
| 8,526,519 B2 | 9/2013 | Chen et al. | |
| 8,599,777 B2 | 12/2013 | Vitthaladevuni et al. | |
| 8,644,422 B2 | 2/2014 | Gao et al. | |
| 8,897,203 B2 | 11/2014 | Song et al. | |
| 2011/0200131 A1* | 8/2011 | Gao | H04B 7/0452 375/267 |
| 2011/0306384 A1* | 12/2011 | Wei | H04B 7/0617 455/522 |
| 2014/0105048 A1 | 4/2014 | Tellado et al. | |
| 2014/0254472 A1* | 9/2014 | Wang | H04W 72/042 370/315 |
| 2016/0149622 A1* | 5/2016 | Ma | H04B 7/0452 370/329 |
| 2016/0219454 A1* | 7/2016 | Sawai | H04W 16/08 |
| 2016/0381720 A1* | 12/2016 | Baek | H04W 8/14 370/329 |

* cited by examiner

*Primary Examiner* — Andrew Lai
*Assistant Examiner* — Harry H Kim

(57) ABSTRACT

Systems and methods are described for selecting relay nodes for Single-User Multiple-Input-Multiple Output (SU-MIMO). A channel orthogonality and Signal-to-Interference-Plus-Noise Ratio (SINR) of a plurality of wireless devices located in a geographic area of an access node is determined. A relay-capable status of the plurality of wireless devices is determined. Non-relay capable wireless devices located in the geographic area are excluded from SU-MIMO. From the plurality of wireless devices, relay-capable wireless devices are selected for SU-MIMO. The selected relay-capable wireless devices are prioritized for SU-MIMO based on a channel orthogonality and SINR meeting a set threshold.

11 Claims, 7 Drawing Sheets

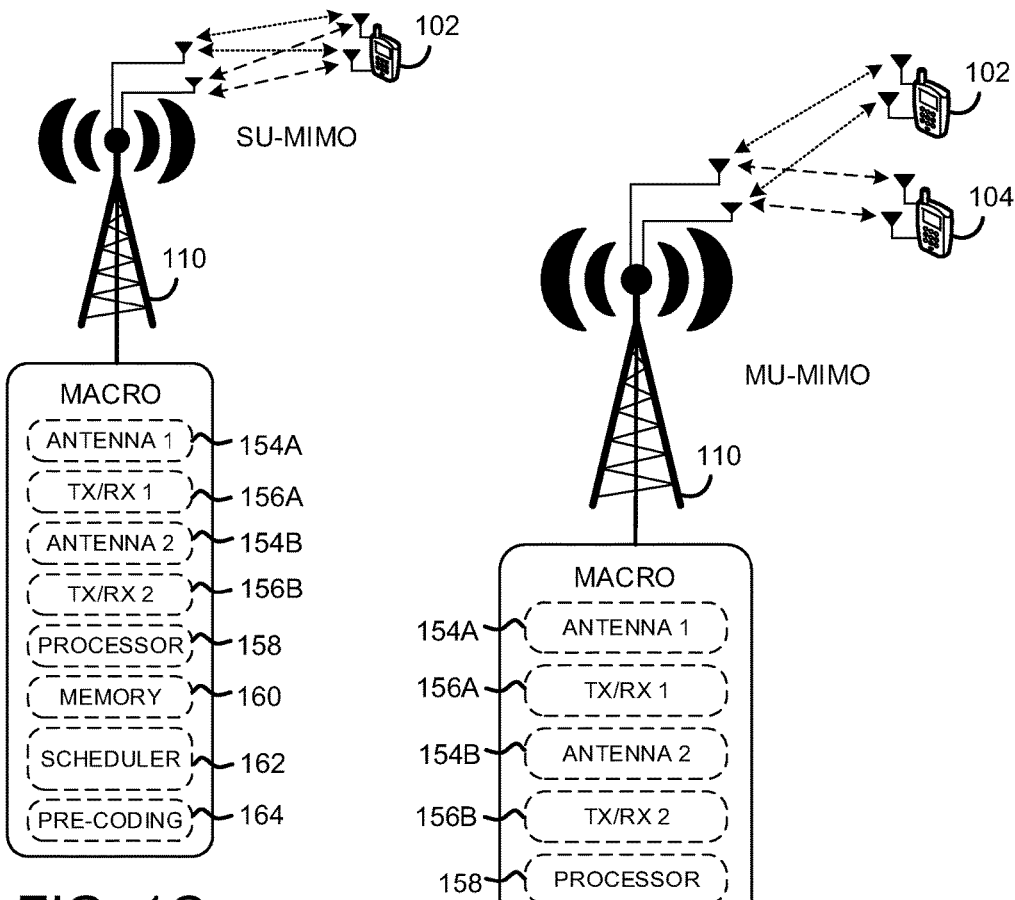
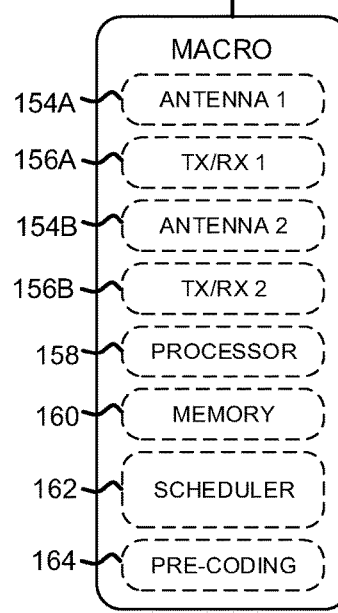
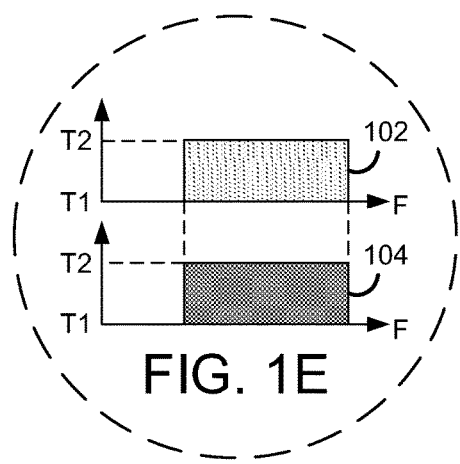
FIG. 1C
FIG. 1D
FIG. 1E

SYSTEMS AND METHODS FOR EXCLUDING RELAY NODES FROM MULTI-USER MULTIPLE-INPUT-MULTIPLE-OUTPUT (MU-MIMO) PAIRING

TECHNICAL BACKGROUND

As wireless networks evolve, the demand for high Quality of Service ("QoS") coupled with, for example, a shortage of wireless spectrum, makes it challenging for network operators to meet user demand. One approach, in Heterogeneous Networks ("HetNet"), is exploitation of Relay Nodes ("RNs"), e.g., low-power nodes and/or relay-capable users, at cell-edges, "hotspots," or coverage "holes" of the network to boost spatial coverage and/or cell-edge capacity. HetNets may also implement wireless technologies such as Single-User and/or Multi-User Multiple-Input-Multiple-Output ("SU/MU-MIMO"), Orthogonal Frequency-Division Multiplexing ("OFDM"), and/or advanced error correction techniques to achieve throughput gains.

Under a typical MU-MIMO scheme, users may be prioritized for MU-MIMO pairing based on, for example, channel orthogonality and/or a Signal-to-Interference-Plus-Noise Ratio ("SINR"), regardless of a RN status, which may reduce efficiencies and decrease overall cell throughput.

OVERVIEW

Systems and methods are described for enabling Multi-User Multiple-Input-Multiple-Output ("MU-MIMO) pairing of wireless devices served by an access node. In one instance, a channel orthogonality and Signal-to-Interference-Plus-Noise Ratio ("SINR") of a plurality of wireless devices located in a geographic area served by the access node is determined. Relay-capable wireless devices located in the geographic area are excluded from MU-MIMO pairing. From the plurality of wireless devices, non-relay capable wireless devices are selected for MU-MIMO pairing. The non-relay capable wireless devices selected for MU-MIMO pairing are prioritized based on a channel orthogonality and SINR meeting a set threshold.

BRIEF DESCRIPTION OF THE DRAWINGS

FIG. 1C illustrates an access node of the exemplary system 100 illustrated in FIG. 1A operating in Single-User MIMO ("SU-MIMO") mode.

FIG. 1D illustrates an access node of the exemplary system 100 illustrated in FIG. 1A operating in MU-MIMO mode.

FIG. 1E illustrates bits used for signaling in SU-MIMO and MU-MIMO mode.

DETAILED DESCRIPTION

Figure 1A:
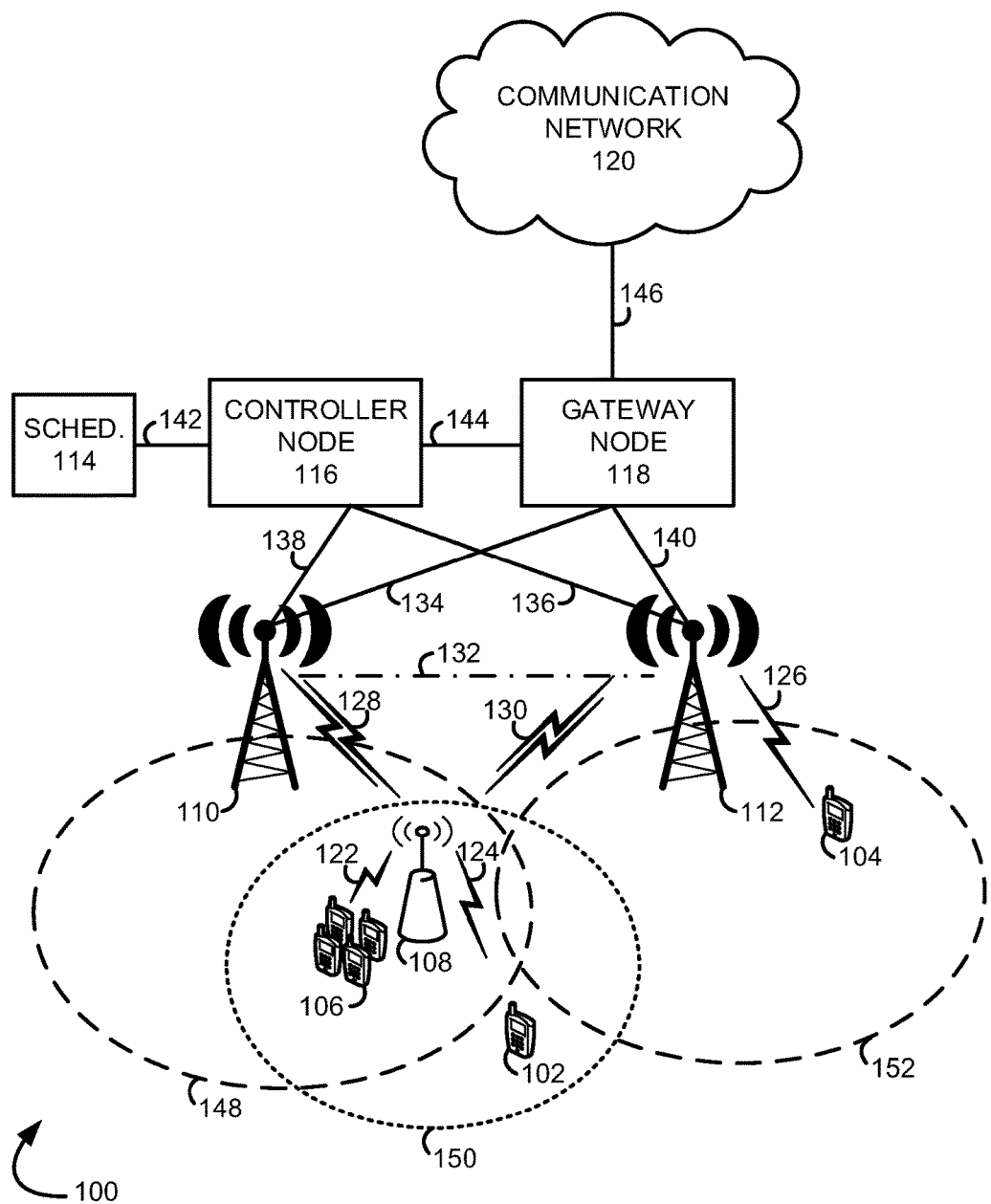
FIG. 1A illustrates an exemplary communication system 100 for excluding Relay Nodes ("RNs") from Multi-User Multiple-Input-Multiple-Output ("MU-MIMO") pairing.
Figure 1B:
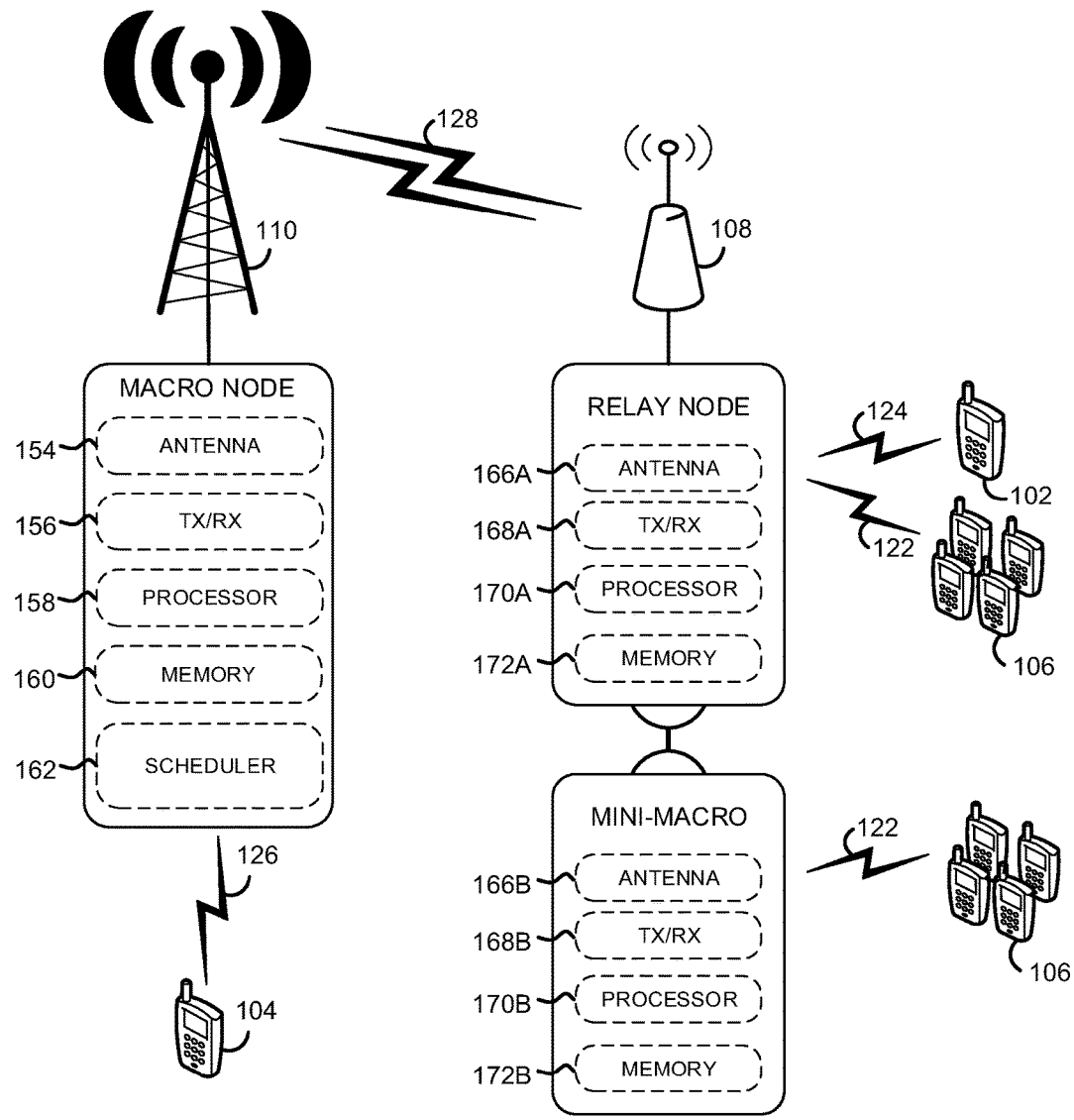
FIG. 1B illustrates a portion of the exemplary system 100 illustrated in FIG. 1A for excluding RNs from MU-MIMO pairing.

FIG. 1A illustrates an exemplary communication system 100 for excluding Relay Nodes ("RNs") from Multi-User Multiple-Input-Multiple-Output ("MU-MIMO") pairing. FIG. 1B illustrates a portion of the exemplary system 100 illustrated in FIG. 1A for excluding RNs from MU-MIMO pairing. FIG. 1C illustrates an access node of the exemplary system 100 illustrated in FIG. 1A operating in Single-User MIMO ("SU-MIMO") mode. FIG. 1D illustrates an access node of the exemplary system 100 illustrated in FIG. 1A operating in MU-MIMO mode. FIG. 1E illustrates bits used for signaling in SU-MIMO and MU-MIMO mode.

In operation, Relay Nodes ("RNs") may be exploited in Heterogeneous Networks ("HetNet") at cell-edges, "hotspots," and/or coverage "holes" of geographical areas 148, 152 of high-powered, large scale access nodes, for example, donor access nodes ("DeNBs") 110 and/or 112, to boost spatial coverage and/or cell-edge capacity. For example, as illustrated in FIGS. 1A and 1B, wireless devices 102, 104, 106 operating at cell-edges, "hotspots," and/or coverage "holes" of geographical areas 148, 152 of DeNBs 110 and/or 112 may experience reduced channel capacity, e.g., low Signal-to-Interference-Plus-Noise ("SINR") levels and/or Quality of Service ("QoS") degradation. In one embodiment, wireless network 120 may instruct DeNBs 110 and/or 112 to select relay-capable wireless devices and/or mini-macros, for example, RN 108, operating within a radio range 150 of wireless devices 102, 104, 106 to function as a RN. DeNBs 110 and/or 112 may select RN 108 from multiple relay-capable wireless devices and/or mini-macros based on, for example, collected Received Signal Strength Indicators ("RSSI") and/or Radio Frequency ("RF") parameters and establish an over-the-air link, for example, interfaces 128, 130, with RN 108.

Once over-the-air links 128, 130 have been established (i.e., between DeNBs 110 and/or 112 and RN 108), DeNBs 110 and/or 112 can instruct other wireless devices (e.g., clustered wireless devices 106, relay/non-relay capable wireless devices 102, 104, mini-macros, etc.) operating within radio range 150 of RN 108 to establish a radio access link, for example, interfaces 122, 124, with RN 108. That is, system 100 may configure RN 108 via DeNBs 110 and/or 112 to function as an offload Access Point ("AP") for wireless devices 102, 106 and/or other RNs operating in the radio range 150 of RN 108; DeNBs 110 and/or 112 may also establish direct links 126 with wireless device 104 and/or other RNs or wireless devices operating in the radio range 150 of RN 108 and/or within geographical areas 148, 152 of DeNBs 110 and/or 112.

RNs are classified based on a number of protocol layers being implemented. For example, RN 108 may be configured as an Amplify-and-Forward ("AF") relay, Decode-and-Forward ("DF") relay, Layer 3 relay, or can function as a mini-macro (e.g., a low-powered radio access node).

AF relays are classified as Layer 1 ("L1") RNs, e.g., full duplex "repeaters" or "boosters," which repeat by amplifying and re-transmitting a signal on a Physical ("PHY") Layer of, for example, an Open Systems Interconnection ("OSI") Model. Because AF relays amplify and re-transmit without decoding (e.g., amplification is carried out on a distorted signal) negative effects of, for example, radio hop, are also amplified, which may deteriorate and/or constrain SINR levels and network throughput. In addition, high processing time at DeNBs may result in Inter-Symbol Interference ("ISI") at RNs and/or end-users. But, due to the mostly transparent nature of AF relays, and negligible relaying delay, AF relays are commonly used in simple coverage extension scenarios.

DF relays are classified as Layer 2 ("L2") RNs. DF relays incorporate the functionalities of a Medium Access Control ("MAC") Layer of, for example, the OSI Model, and function as DeNBs, lacking only a fixed connection (e.g., wired backhaul links) to the operator's core network, i.e., DF relays are self-backhauling. DF relays perform full signal reception and/or re-transmit procedures up to a Transmission Control Protocol ("TCP") Layer of, for example, the OSI Model, and use signal processing to decode and then re-generate useful signals including: error correction, re-modulation, and re-encoding. Because DF relay signal processing introduces delay and/or complexity to the system, e.g., due to the modulation/de-modulation and/or encoding/re-encoding of signals, QoS for certain delay-sensitive traffic, for example, Voice-Over-IP ("VoIP"), may decrease. But, DF relays are extremely useful in interference-limited scenarios, for example, to enhance cell-edge performance.

L3 RNs include full Radio Resource Control ("RRC") capabilities and include all of the protocol functionalities of DeNBs. For example, L3 RNs can communicate with DeNBs through an x2-like interface, e.g., similar to link 132 illustrated in FIG. 1A, or, when not configured as a RN, with DeNBs over a radio access link. L3 RNs can implement Packet Data Convergence Protocols ("PDCP") and/or Service Data Units ("SDUs"), etc., such that data packets at an Internet Protocol ("IP") Layer of, for example, the OSI Model, are viewable at the RN. L3 RNs perform de-modulation and de-coding of received RF signals (either uplink ("UL") or downlink ("DL")), process received data (e.g., by ciphering, combining/dividing, encoding, modulating, etc.), and re-transmit the data to, for example, end-users. L3 RNs may be assigned a unique Physical Cell Identity ("PCI") via the PHY Layer, which is different from a PCI assigned to DeNBs.

RNs can also be classified based on a network resource usage strategy on the over-the-air and radio access links. For example, RNs use of spectrum may be classified as In-Band or Out-Band relaying. In one embodiment, data packets related to applications running on wireless devices 102, 106 can be uploaded/downloaded from system 100 on UL and/or DL portions of over-the-air links 128, 130 and/or radio access links 122, 124 via sub-layers of a User Plane ("UP") protocol stack of, for example, the OSI Model. For In-Band relaying, over-the-air links 128, 130 and/or radio access links 122, 124 are operated on a same frequency carrier. To avoid self-interference, over-the-air links 128, 130 and/or radio access links 122, 124 are time-multiplexed through reuse of Multimedia-Broadcast-Over-Single-Frequency-Network ("MBSFN") subframes. For Out-Band relaying, over-the-air links 128, 130 and/or radio access links 122, 124 are operated on different carrier frequencies/spectrum. Out-Band relaying improves network capacity at the expense of larger spectrum demand for over-the-air links 128, 130.

Referring to FIGS. 1A-1E, RN 108 and/or wireless devices 102, 104, 106 operating in geographical areas 148, 152 of DeNBs 110, 112 and/or radio range 150 of RN 108 may continue to experience reduced channel capacity, e.g., low SINR levels, and/or QoS degradation due to, for example, limited backhaul capacity of DeNBs 110 and/or 112. In an exemplary embodiment, system 100 may implement wireless technologies such as SU/MU-MIMO, OFDM, and/or advanced error correction techniques to achieve throughput gains.

As illustrated in FIGS. 1A and 1C-1E, system 100 can configure DeNBs 110 and/or 112 to operate in SU/MU-MIMO Mode. For example, multiple transmit/receive ("Tx/Rx") antennas 154, 154A, 154B, 166A, 166B, may be deployed at DeNBs 110, 112, RN 108, and/or wireless devices 102, 104, 106 such that signals on the Tx/Rx antennas (e.g., received at 156, 156A, 156B, 168A, 168B) are "combined" using the same resources in both frequency and time, illustrated in FIG. 1E, to improve the Bit Error Rate ("BER") or data rate (e.g., bits/sec) for SU/MU-MIMO end-users. To achieve throughput gains, DeNBs 110 and/or 112 may optimize networks' 120 multipath conditions for SU/MU-MIMO by targeting rich scattering conditions (i.e., where signals bounce around the environment of geographical areas 148, 152) and high SINR levels for multipath signals. In other words, DeNBs 110 and/or 112 operating in SU/MU-MIMO mode are configured to exploit multipath propagation by, for example, taking advantage of random fading, multipath delay spread, etc.

In SU-MIMO mode, MIMO data streams are sent between DeNBs 110 and/or 112 and a single wireless device 102 (i.e., point-to-point). For example, as illustrated in FIG. 1C, DeNB 110 may be configured to operate in SU-MIMO mode (e.g., transmit diversity, closed-loop SU-MIMO, open-loop SU-MIMO, and/or adaptive beamforming) to increase peak data rates (e.g., data rates over 300 Mbit/s) for wireless device users, for example, end-user 102.

In MU-MIMO mode, separate data streams are sent to spatially separated RNs and/or wireless devices over a same sub-channel, with each RN and/or wireless device serving as one of multiple Rx antennas. For example, as illustrated in FIG. 1D, MU-MIMO data streams may be transmitted between DeNB 110 and wireless devices 102, 104 using a same PRB (e.g., in both frequency and time, illustrated in FIG. 1E) to increase overall system capacity, though MU-MIMO does not increase throughput for individual RN's and/or wireless devices located in a geographical area of DeNBs over single-antenna techniques.

DeNBs 110 and/or 112 operating in SU/MU-MIMO mode may receive information from RN 108 and/or wireless devices 102, 104, 106 including: (i) a Rank Indicator ("RI"), which indicates a number of layers (e.g., data/spatial streams) that can be supported under current channel conditions and a modulation scheme; and, (ii) a Channel Quality Indicator ("CQI"), which indicates channel conditions under the current operating mode (e.g., SU/MU-MIMO mode), roughly corresponding to SINR. DeNBs 110 and/or 112 use CQI to select a correct Modulation and Coding Scheme ("MCS") for the indicated channel conditions. Combined with the MCS, CQI can be converted into an expected throughput, which is used by DeNBs 110 and/or 112 to adjust a current operating mode (e.g., SU/MU-MIMO mode) and/or to allocate PRBs to RN 108 and/or wireless devices 102, 104, 106. For example, DeNBs 110 and/or 112 can allocate PRBs based on whether the CQI and RI reported by the RN 108 and/or wireless devices 102, 104, 106 match an expected value, and whether signals on the Rx antennas are being received at an acceptable error rate.

RNs 108 and/or wireless devices 102, 104, 106 may also analyze the channel conditions of each Tx/Rx antenna, including multipath conditions. For example, RNs 108 and/or or wireless devices 102, 104, 106 can provide an RI and Precoding Matrix Indicator ("PMI"), which determines an optimum precoding matrix for a current channel conditions, to DeNBs 110 and/or 112. Based on the RI and PMI, RNs 108 and/or wireless devices 102, 104, 106 can provide a CQI to DeNBs 110 and/or 112, i.e., instead of basing CQI on the SU/MU-MIMO mode at DeNBs 110 and/or 112. This enables DeNBs 110 and/or 112 to adapt data transmissions based on channel conditions, for example, using memory 160, scheduler 162, and/or pre-coding module 164.

Referring to FIGS. 1A and 1D, DeNBs 110 and/or 112 are configured to operate in MU-MIMO mode. On the UL, RN 108 and/or wireless devices 102, 104 are paired to share a same set of PRBs (e.g., in both frequency and time, illustrated in FIG. 1E) for UL data streams to achieve throughput gains. Throughput gains are expected to be larger based on a higher number of Rx antennas at DeNBs 110 and/or 112, for example, 4Rx, 8Rx, etc., may have higher gains than 2Rx.

Because MU-MIMO performance relies on good RN and/or wireless device pairing and/or co-scheduling at DeNBs, pairing decisions are made at, for example, DeNBs 110 and/or 112 at every subframe, for example, every millisecond. Primary criteria for RN 108 and/or wireless device 102, 104, 106 pairing includes: (i) channel orthogonality (i.e., non-overlapping and non-interfering channels) above a set threshold, which may be achieved by assigning cyclic shifts allocated to a Demodulation Reference Signal ("DM-RS") to differentiate parallel data streams received at DeNB 110; and, (ii) SINR above a set threshold.

Other secondary criteria for RN 108 and/or wireless device 102, 104 pairing includes: (i) not pairing RNs and/or wireless devices if PRBs in a current TTI are enough to schedule the RNs and/or wireless devices without pairing; (ii) configuring DeNBs to calculate an expected cell throughput gain from pairing and if no throughput gain is determined, then the selected wireless devices are not paired; (iii) excluding Hybrid-Automatic-Repeat-Requests ("HARQ") re-transmission RNs and/or wireless devices from pairing; (iv) requiring a higher priority for Non-Giga Bit Rate ("Non-GBR") RNs and/or wireless devices for pairing; (v) excluding RNs and/or wireless devices using TTI bundling from pairing; (vi) selecting high-speed RNs and/or wireless devices with low priority for pairing; and (vii) excluding TTI bundling RNs and/or wireless devices located at cell-edges of geographical areas of DeNBs from pairing.

Because DeNBs operating under a typical MU-MIMO mode prioritize users for MU-MIMO pairing primarily based on, for example, channel orthogonality and/or SINR, efficiencies for end-users, for example, wireless devices 102, 106 illustrated in FIG. 1A, of RNs chosen for MU-MIMO pairing may be reduced, decreasing overall cell-throughput. Given that RNs support multiple end-users, it is desirable to exclude users from MU-MIMO pairing based on a "relay" status of the user to improve average cell-throughput of the wireless network.

Communication system 100 includes wireless devices 102, 104, 106, RN 108, DeNBs 110, 112, scheduler 114, controller node 116, gateway node 118, and communication network 120. Other network elements may be present in the communication system 100 to facilitate communication, but are omitted for clarity, such as controller nodes, base stations, base station controllers, gateways, mobile-switching centers, dispatch application processors, and location registers such as a Home Location Register ("HLR") or Visitor Location Register ("VLR"). Furthermore, other network elements may be present to facilitate communication between DeNBs 110, 112 and communication network 120, which are omitted for clarity, including additional processing nodes, routers, gateways, and physical and/or wireless data links for carrying data among the various network elements.

Wireless devices 102, 104, 106 can be any device configured to communicate over system 100 using a wireless interface. For example, wireless devices 102, 104, 106 can include a Remote Terminal Unit ("RTU"), a cell phone, a smart phone, a computing platform such as a laptop, palmtop, or a tablet, a Personal Digital Assistant ("PDA"), or an internet access device, and combinations thereof. It is noted that while three wireless devices are illustrated in FIGS. 1A-1D as being in communication with one of RNs 108 and/or DeNBs 110, 112, any number of wireless devices can be implemented according to various exemplary embodiments disclosed herein.

The wireless interfaces of wireless devices 102, 104, 106 can include, for example, one or more transceivers for transmitting and receiving data over communication system 100. Each transceiver can be associated with the same or different frequency bands, the same or different radio access technologies, the same or different network providers, and/or the same or different services. For example, wireless devices 102, 104, 106 can include a transceiver that is associated with one or more of the following: Code Division Multiple Access ("CDMA") 1×RTT, Global System for Mobile communications ("GSM"), Worldwide Interoperability for Microwave Access ("WiMAX"), Universal Mobile Telecommunications System ("UMTS"), Evolution Data Optimized ("EV-DO"), EV-DO rev. A, Third Generation Partnership Project Long Term Evolution ("3GPP LTE"), and/or High-Speed Downlink Packet Access ("HSDPA"), IEEE 802.11, Wireless Fidelity ("Wi-Fi"), Bluetooth, Zigbee, Infrared Data Association ("IrDA"), Multimedia Broadcast Multicast Service ("MBMS"), etc.

Wireless devices 102, 104, 106 can transmit and/or receive information over communication system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, news alerts, etc.

RN 108 may be any relay-capable wireless device and/or mini-macro (e.g., a low-powered radio access node, for example, a PICO node, FEMTO node, Remote Radio Head ("RRH"), etc.) capable of providing wireless communications to other RNs and/or wireless devices 102, 104, 106 via DeNBs 110, 112, and/or communication network 120 using a wired or wireless interface. RN 108 may be configured to connect to DeNBs 110 and/or 112 via an In-Band/Out-Band over-the-air backhaul link 128, 130 and/or a dedicated wired (e.g., Ethernet) or wireless (microwave) backhaul link. Links 128, 130 can comprise, RF, microwave, infrared, or other similar signal, and can use a suitable protocol, for example, CDMA 1×RTT, GSM, WiMAX, UMTS, EV-DO, EV-DO rev. A, 3GPP LTE, HSDPA, IEEE 802.11, Wi-Fi, IrDA, or combinations thereof. Although one RN 108 is illustrated in FIGS. 1A and 1B as being in communication with DeNBs 110 and/or 112, any number of RNs can be implemented according to various exemplary embodiments disclosed herein.

DeNBs 110 and 112 can be any network node capable of providing wireless communications to RN 108 and/or wireless devices 102, 104, 106 and can be, for example, a Base Transceiver Station ("BTS"), a radio base station, an eNodeB device, or an enhanced eNodeB device. DeNBs 110 and 112 can include a scheduler module 162, illustrated in FIGS. 1B-1D, or can be in communication with scheduler node 114, illustrated in FIG. 1A. DeNBs 110 and 112 can use scheduler module 162 and/or scheduler node 114 to allocate resources (e.g., the next available PRB, wireless spectrum, etc.) to RN 108 and/or wireless devices 102, 104, 106. Scheduler module 162 and/or scheduler node 114 can collect and store capacity and transmission delay characteristics (e.g., buffered data, signal quality, throughput, GBR/Non-GBR, busy hour, backhaul capacity, mobility, etc.) reported by RN 108 and/or wireless devices 102, 104, 106 at DeNBs 110 and/or 112 and can distribute resources via a scheduling algorithm to RN 108 and/or wireless devices 102, 104, 106 based on the collected characteristics, "relay" status, and/or an operating mode (e.g., SU/MU-MIMO) of DeNBs 110 and/or 112.

DeNBs 110, 112 and RN 108 can comprise processors 158, 170A, 170B and associated circuitry to execute or direct the execution of computer-readable instructions to obtain information. DeNBs 110, 112 and RN 108 can retrieve and execute software from storage 160, 172A, 172B, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. DeNBs 110, 112 and RN 108 can receive instructions and other input at a user interface. Although only DeNBs 110, 112 and RN 108 are illustrated in FIGS. 1A-1D, RN 108 and wireless devices 102, 104, 106 can be in communication with a plurality of DeNBs. The plurality of DeNBs can be associated with different networks and can support different communication protocols and radio access technologies.

Controller node 116 can be any network node configured to communicate information and/or control information over communication system 100. Controller node 116 can be a standalone computing device, computing system, or network component, and can be accessible, for example, by a wired or wireless connection, or through an indirect connection such as through a computer network or communication network. For example, controller node 116 can include a Mobility Management Entity ("MME"), a Home Subscriber Server ("HSS"), a Policy Control and Charging Rules Function ("PCRF"), an Authentication, Authorization, and Accounting ("AAA") node, a Rights Management Server ("RMS"), a Subscriber Provisioning Server ("SPS"), a policy server, etc. One of ordinary skill in the art would recognize that controller node 116 is not limited to any specific technology architecture, such as LTE, and can be used with any network architecture and/or protocol.

Controller node 116 can comprise a processor and associated circuitry to execute or direct the execution of computer-readable instructions to obtain information. Controller node 116 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 116 can receive instructions and other input at a user interface.

Gateway node 118 can be any network node configured to interface with other network nodes using various protocols that communicate, route, and forward communication data addressed to DeNBs 110, 112, RN 108, and/or wireless devices 102, 104, 106. In addition, gateway node 118 can act as a mobility anchor for RN 108 and/or wireless devices 102, 104, 106 during handovers between different frequencies and/or different radio access technologies supported by the same access node. Gateway node 118 can be a standalone computing device, computing system, or network component, and can be accessible, for example, by a wired or wireless connection, or through an indirect connection such as through a computer network or communication network. For example, gateway node 118 can include a Serving Gateway ("SGW") and/or Public Data Network Gateway ("PGW"), etc. One of ordinary skill in the art would recognize that gateway node 118 is not limited to any specific technology architecture, such as LTE, and can be used with any network architecture and/or protocol.

Gateway node 118 can comprise a processor and associated circuitry to execute or direct the execution of computer-readable instructions to obtain information. Gateway node 118 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 114 can receive instructions and other input at a user interface.

Communication links 122, 124, 126, 128, 130, 132, 134, 136, 138, 140, 142, 144, 146 can be wired or wireless communication links and use various communication protocols such as Internet, Internet Protocol ("IP"), LAN, optical networking, Hybrid Fiber Coax ("HFC"), telephony, T1, or some other communication format—including combinations, improvements, or variations thereof. Wireless communication links 122, 124, 126, 128, 130, 132, 134, 136, 138, 140, 142, 144, 146 can comprise, for example, RF, microwave, infrared, or other similar signal, and can use a suitable communication protocol, for example, CDMA 1×RTT, GSM, WiMAX, UMTS, EV-DO, EV-DO rev. A, 3GPP LTE, HSDPA, IEEE 802.11, Wi-Fi, IrDA, or combinations thereof. Communication links 122, 124, 126, 128, 130, 132, 134, 136, 138, 140, 142, 144, 146 can be a direct link or might include various equipment, intermediate components, systems, and networks.

Wireless communication links 122, 124, 126, 128, 130, 132, 134, 136, 138, 140, 142, 144, 146 can comprise one or more logical channels, one or more transport channels, and one or more physical channels. A logical channel typically describes different flows of information, such as bearer data and/or signaling information, and can be organized differently for UL and DL portions of communication links 122, 124, 126, 128, 130, 132, 134, 136, 138, 140, 142, 144, 146. A transport channel can organize information, such as data packets, received from one or more logical channels for transmission over communication links 122, 124, 126, 128, 130, 132, 134, 136, 138, 140, 142, 144, 146, and can define how and with what type of characteristics information is transferred by the physical channel. A physical channel can comprise, for example, a carrier frequency or a number of carrier frequencies in a communication link 122, 124, 126, 128, 130, 132, 134, 136, 138, 140, 142, 144, 146, and can provide a physical transmission medium for one or more transport channels.

Communication network 120 can be a wired and/or wireless communication network, and can comprise processing nodes, routers, gateways, and physical and/or wireless data links for carrying data among various network elements, including combinations thereof, and can include a LAN, a WAN, and an internetwork (including the Internet). Communication network 120 can be capable of carrying data, for example, to support voice, push-to-talk, broadcast video, and data communications by a wireless device, such as, for example, wireless devices 102, 104, 106. Wireless network protocols can comprise CDMA 1×RTT, GSM, WiMAX, UMTS, EV-DO, EV-DO rev. A, 3GPP LTE, HSDPA, IEEE 802.11, Wi-Fi, IrDA, and combinations thereof. Wired network protocols that may be utilized by communication network 120 comprise Ethernet, Fast Ethernet, Gigabit Ethernet, Local Talk (such as Carrier Sense Multiple Access with Collision Avoidance), Token Ring, Fiber Distributed Data Interface ("FDDI"), and Asynchronous Transfer Mode ("ATM"). Communication network 120 may also comprise additional base stations, controller nodes, telephony switches, internet routers, network gateways, computer systems, communication links, or some other type of communication equipment, and combinations thereof.

Figure 2:
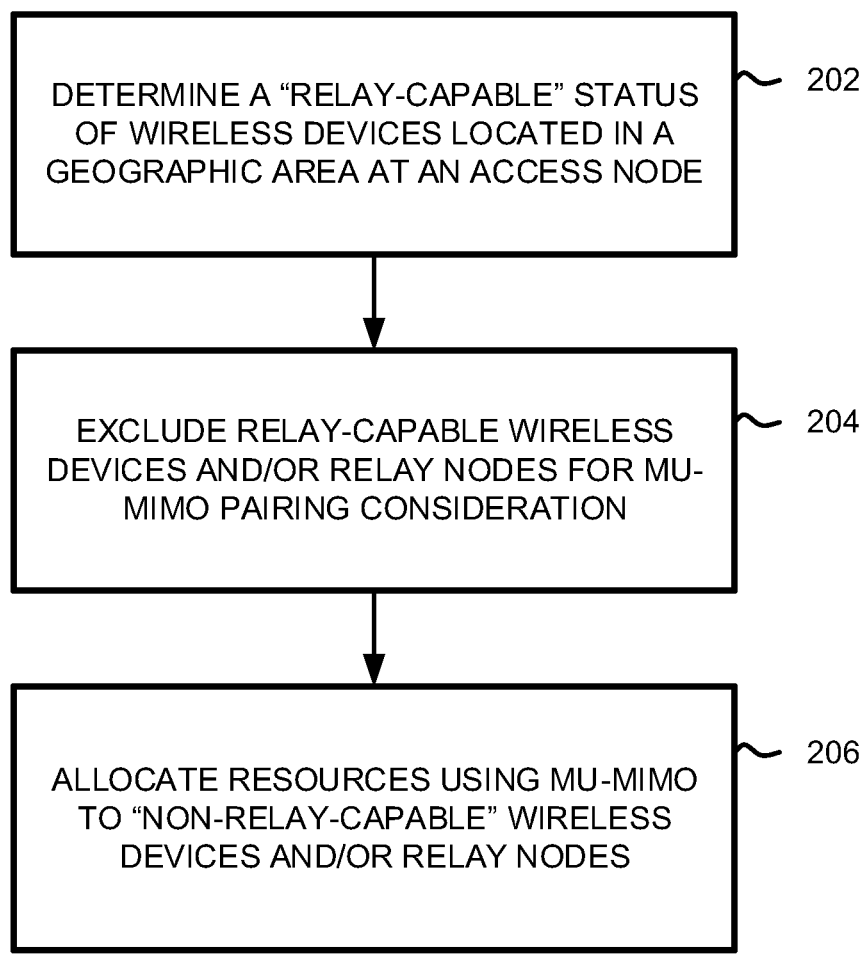
FIG. 2 illustrates an exemplary method for excluding RNs from MU-MIMO pairing.

FIG. 2 illustrates an exemplary illustrates an exemplary method for excluding RNs from MU-MIMO pairing. The method will be discussed with reference to aspects of the exemplary communication system 100 illustrated in FIGS. 1A-1E. However, the method can be implemented with any suitable communication. In addition, although FIG. 2 depicts steps performed in a particular order for purposes of illustration and discussion, the method discussed herein is not limited to any particular order or arrangement. One skilled in the art, using the disclosures provided herein, will appreciate that various steps of the method can be omitted, rearranged, combined and/or adapted in various ways.

Referring to FIG. 2, at step 202, a relay-capable status of wireless devices and/or mini-macros located in a geographic area of an access node is determined. For example, as illustrated in FIGS. 1A and 1B, wireless devices 102, 104, 106 operating at cell-edges, "hotspots," and/or coverage "holes" of geographical areas 148, 152 of DeNBs 110, 112 may experience reduced channel capacity, e.g., low SINR levels and/or QoS degradation. Wireless network 120 may instruct DeNBs 110 and/or 112 to select relay-capable wireless devices and/or mini-macros operating within geographical areas 148, 152 and/or a radio range of wireless devices 102, 104, 106 to function as a RN, for example, RN 108. DeNBs 110 and/or 112 may select RN 108 from multiple relay-capable wireless devices and/or mini-macros based on, for example, collected RSSI and/or RF parameters reported by the relay-capable wireless devices and/or mini-macros at DeNBs 110 and/or 112.

Once RN 108 has been selected, DeNBs 110 and/or 112 may perform an attach procedure. For example, an RRC Connection setup may be performed between RN 108 and DeNBs 110 and/or 112. RN 108 may transmit a RN capability indicator (e.g., which indicates a relay-capable "status" of RN 108) to DeNBs 110 and/or 112 during the RRC Connection establishment. Based on the RN capability indicator, DeNBs 110 and/or 112 may establish an interface, for example, an S1 interface, with controller node 116 for signaling support of RN 108. If controller node 116 is capable of supporting RN 108, controller node 116 may transmit an RN support message to DeNBs 110 and/or 112 during the S1 interface setup and implement an Operations, Administration, and Management ("OAM") protocol to complete RN configuration. After configuration, DeNBs 110 and/or 112 may initiate setup of bearers (e.g., S1/x2/Un bearers) for RN 108 and RN 108 may initiate setup of interfaces (e.g., S1, x2, Un, Uu interfaces) with DeNBs 110 and/or 112. DeNBs 110 and/or 112 may also initiate an RN reconfiguration procedure via RRC signaling for RN-specific parameters. After the RN reconfiguration update procedure is performed, DeNBs 110 and/or 112 can update the PCI of RN 108 and instruct wireless devices 102, 106 within a radio range 150 of RN 108 to communicate over the network 120 via RN 108. For example, DeNBs 110 and/or 112 may perform a handover of wireless devices 102, 106 from DeNBs 110 and/or 112 to RN 108.

At step 204, relay-capable wireless devices and/or RNs are excluded for MU-MIMO pairing. In one embodiment, DeNBs 110 and/or 112 may be configured to operate in SU/MU-MIMO mode. Multiple Tx/Rx antennas are deployed at DeNBs 110, 112, RN 108, and/or wireless devices 102, 104, 106 such that signals on the Tx/Rx may be combined using a same PRB (e.g., in both frequency and time, as illustrated in FIG. 1E) to improve the BER or data rate (e.g., bits/sec) for SU/MU-MIMO end-users.

For example, DeNBs 110 and/or 112 operating in SU/MU-MIMO mode may receive information from RN 108 and/or wireless devices 102, 104, 106 located in geographic areas 148, 152 including: (i) RI, which indicates a number of layers (e.g., data/spatial streams) that can be supported under current channel conditions and a modulation scheme; and, (ii) a CQI, which indicates channel conditions under SU/MU-MIMO operating mode, roughly corresponding to SINR. Based on the CQI's collected from RN 108 and/or wireless devices 102, 104, 106, DeNBs 110 and/or 112 select a correct MCS for the channel conditions. Combined with the MCS, CQI can be converted into an expected throughput, which is used by DeNBs 110 and/or 112 to adjust a current operating mode (e.g., SU/MU-MIMO mode) and an amount of PRBs allocated to RNs 108 and/or wireless devices 102, 104, 106.

RN 108 and/or wireless devices 102, 104, 106 may also analyze channel conditions and provide an RI and PMI to DeNBs 110 and/or 112. Based on the RI and PMI, RN 108 and/or wireless devices 102, 104, 106 can provide a CQI to DeNBs 110 and/or 112, i.e., instead of basing CQI on the SU/MU-MIMO operating mode at DeNBs 110 and/or 112. This enables DeNBs 110 and/or 112 to adapt data transmissions based on channel conditions, for example, using memory 160, packet schedulers 114, 162, and/or pre-coding module 164.

In an exemplary embodiment, packet schedulers 114, 162 for DeNBs 110 and/or 112 operating in SU/MU-MIMO mode can be carried out in two phases: time domain packet scheduler ("TDPS") and frequency domain packet scheduler ("FDPS"), as illustrated in FIG. 1E. RN 108 and/or wireless devices 102, 104, 106 are scheduled in SU/MU-MIMO mode based on, for example, MU-MIMO pairing criteria being met.

For pairing purposes, RN 108 and/or wireless devices 102, 104, 106 are classified into primary (i.e., RNs and/or wireless devices scheduled for transmission using a same SU-MIMO TD-FD PS scheme) and candidate (i.e., MU-MIMO candidate RNs and/or wireless devices) RNs and/or wireless devices. For each PRB, DeNBs 110 and/or 112 may select from the list of MU-MIMO candidates a best RN and/or wireless device to pair with a select primary RN and/or wireless devices. Because MU-MIMO performance relies on good RN and/or wireless device pairing and/or co-scheduling at DeNBs, pairing decisions are made at DeNBs 110 and/or 112 at every subframe, for example, every millisecond.

Typically, the primary criteria for RNs 108 and/or wireless devices 102, 104, 106 pairing includes: (i) channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams received at DeNBs 110 and/or 112; and, (ii) SINR above a set threshold.

For example, candidate RNs and/or wireless devices should have an assigned Precoder that is orthogonal to the selected primary RN and/or wireless devices. In an exemplary embodiment, DL transmission schemes of DeNBs 110 and/or 112 may be supported at a PHY layer of the OSI Model by a set of DL reference signals. These reference signals can be specific to RN 108 and/or wireless devices 102, 104, 106, i.e., DM-RS, or specific to geographical areas 148, 152 of DeNBs 110 and/or 112, i.e., Common Reference Signals ("CRS"). DM-RS' are pre-coded signals used for demodulation purposes on scheduled PRBs. For example, pre-coding module 164 of DeNBs 110 and/or 112 may apply pre-coding to data transmissions targeted to RN 108 and/or wireless devices 102, 104, 106 based on channel feedback received from RN 108 and/or wireless devices 102, 104, 106, including RI, CQI, and PMI. CRS' are not pre-coded signals and are used by RNs 108 and/or wireless devices 102, 104, 106 for channel estimation.

To fully exploit MU-MIMO mode, data/spatial streams intended to/from DeNBs 110 and/or 112 to/from RN 108 and/or wireless devices 102, 104, 106 need to be well separated and orthogonal at both Tx/Rx sides. Optimal pre-coding for MU-MIMO mode at, for example, pre-coding module 164 of DeNBs 110 and/or 112, may include Dirty Paper Coding ("DPC") combined with user scheduling (e.g., from schedulers 114 and/or 164) and power loading. Additional pre-coding techniques may include Channel Inversion ("CI"), e.g., to cancel interference, and/or Regularized Channel Inversion ("RCI"), e.g., to attenuate interference. To avoid scheduling RNs 108 and/or wireless devices 102, 104, 106 located at, for example, a cell-edge of DeNBs 110 and/or 112, into MU-MIMO mode, a predicted SINR of both the primary and candidate RNs 108 and/or wireless devices 102, 104, 106 at the considered PRB are compared to the set threshold.

Generally, in addition to channel orthogonality and SINR, other secondary criteria are used for RN and/or wireless device MU-MIMO pairing, including: (i) not pairing RNs and/or wireless devices if PRBs in a current TTI are enough to schedule RNs and/or wireless devices without pairing; (ii) configuring DeNBs to calculate an expected cell throughput gain from pairing and, if no throughput gain is determined, then the selected wireless devices are not paired; (iii) excluding HARQ re-transmission RNs and/or wireless devices from pairing; (iv) requiring a higher priority for Non-GBR RNs and/or wireless devices for pairing; (v) excluding RNs and/or wireless devices using TTI bundling from pairing; (vi) selecting high-speed RNs and/or wireless devices with low priority for pairing; and (vii) excluding TTI bundling RNs and/or wireless devices located at cell-edges of geographical areas from pairing.

In an exemplary embodiment, DeNBs 110 and/or 112 may generate a list of RNs 108 and/or wireless devices 102, 104, 106 that meet the primary and/or secondary criterion and store the candidate list at, for example, memory module 160 of DeNBs 110 and/or 112. Typically, candidate RNs and/or wireless devices from the list that have a highest metric (e.g., based on the primary and secondary criterion) in MU-MIMO mode are selected for pairing with the primary RN and/or wireless devices and are set to MU-MIMO transmission mode. If none of the candidate RNs and/or wireless devices meet the primary and/or secondary criterion, the primary RN and/or wireless devices will transmit in SU-MIMO mode.

Because DeNBs 110 and/or 112 operating under a typical MU-MIMO mode prioritize users i.e., RN 108 and/or wireless devices 102, 104, 106, for MU-MIMO pairing primarily based on, for example, channel orthogonality and/or SINR, efficiencies for end-users of RNs chosen for MU-MIMO pairing may be reduced, decreasing overall cell-throughput. Given that RNs support multiple end-users, it is desirable to exclude users for MU-MIMO pairing based on a "relay" status of the user, that is, relay-capable wireless devices (including mini-macros) and/or RNs, to improve average cell-throughput of the wireless network. Average cell-throughput may be improved, in part, by transmitting data packets to relay-capable wireless devices (including mini-macros) and/or RNs using SU-MIMO.

At step 206, resources are allocated to non-relay-capable wireless devices (including mini-macros) paired for MU-MIMO transmissions based on priority. For example, scheduler 114 and/or scheduler module 162 of DeNBs 110 and/or 112 may allocate resources (e.g., the next available PRB, wireless spectrum, etc.) to non-relay-capable wireless devices paired for MU-MIMO transmissions based on, for example, capacity and transmission delay characteristics reported at DeNBs 110 and/or 112 and can distribute resources via a scheduling algorithm (e.g., proportional fairness, round robin, etc.). The scheduling algorithms may prioritize resource allocation based on the collected characteristics, "relay" status, and/or an operating mode, i.e., SU/MU-MIMO mode, of DeNBs 110, 112, RN 108, and wireless devices 102, 104, 106.

Figure 3:
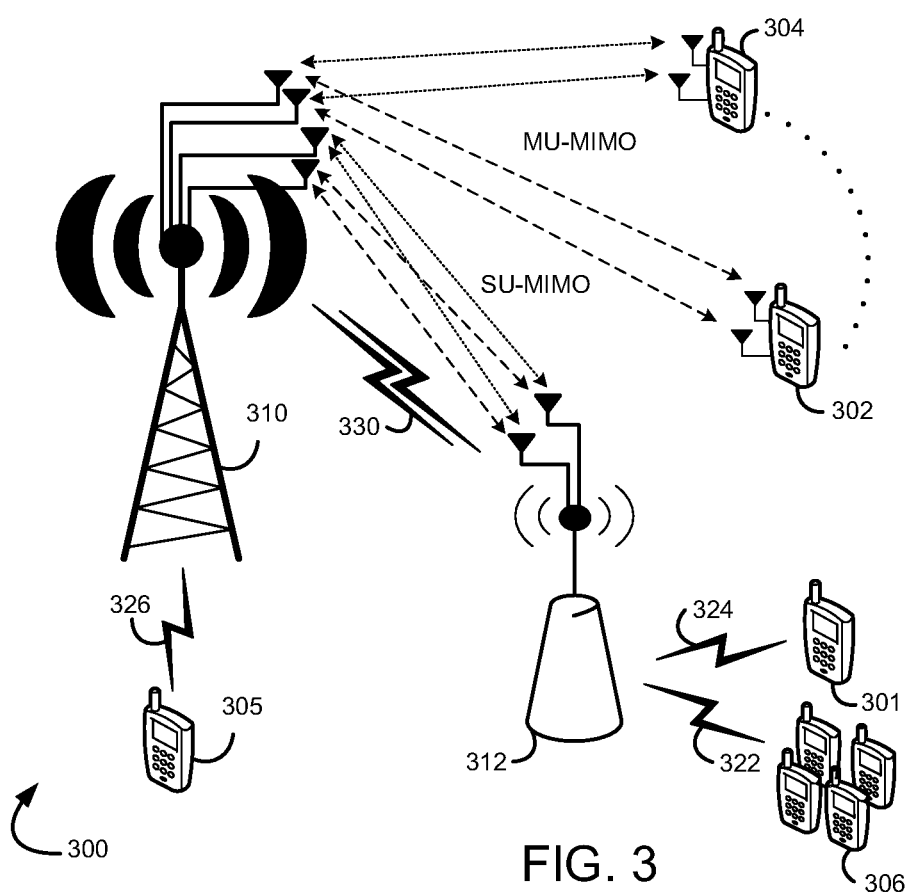
FIG. 3 illustrates a portion of an exemplary communication system for excluding RNs from MU-MIMO pairing.

FIG. 3 illustrates a portion 300 of the exemplary communication system 100 illustrated in FIGS. 1A-1E for excluding RNs for MU-MIMO pairing. FIG. 3 will be discussed with reference to aspects of the exemplary communication system 100 illustrated in FIGS. 1A-1E.

In operation, RNs may be exploited at cell-edges, "hotspots," and/or coverage "holes" of geographical areas of high-powered, large scale access nodes, for example, DeNB 310, to boost spatial coverage and/or cell-edge capacity. RN 312 may be configured to serve a plurality of end-users 301, 306 via In-Band and/or Out-Band over-the-air interfaces 330 to DeNB 310 and can be classified based on a number of protocol layers being implemented, as discussed in reference to FIGS. 1A-1D. For example, RN 312 may be configured as an AF relay, DF relay, and/or L3 relay. DeNB 310 may also establish direct links 326 with wireless devices 302, 304, 305 and/or other RNs operating in a radio range of RN 312 and/or within a geographical area of DeNB 310.

As illustrated in FIG. 3, DeNBs 310 can be configured to operate in SU/MU-MIMO Mode. For example, multiple Tx/Rx antennas may be deployed at DeNB 310, RN 312, and/or wireless devices 301, 302, 304, 305, 306 such that signals on the Tx/Rx may be combined using a same PRB (e.g., in both frequency and time, as illustrated in FIG. 1E) to improve the BER or data rate (e.g., bits/sec) for SU/MU-MIMO end-users. DeNB 310 can receive information from RN 312 and/or wireless devices 301, 302, 304, 305, 306 located in geographic areas of DeNB 310 including RI and CQI. Based on the CQI's collected from RN 312 and/or wireless devices 301, 302, 304, 305, 306, DeNB 310 can select a correct MCS for the channel conditions. Combined with the MCS, CQI can be converted into, for example, an expected throughput. DeNB 310 can use this information to adjust its current operating mode (e.g., SU/MU-MIMO mode) and an amount of PRBs allocated to RN 312 and/or wireless devices 301, 302, 304, 305, 306. RN 312 and/or wireless devices 301, 302, 304, 305, 306 may also analyze channel conditions and provide an RI and PMI to DeNB 310. Based on the RI and PMI, RN 312 and/or wireless devices 301, 302, 304, 305, 306 can provide a CQI to DeNB 310 instead of basing CQI on the SU/MU-MIMO operating mode at DeNB 310. This enables DeNB 310 to adapt data transmissions based on channel conditions, for example, using memory, packet schedulers, and/or pre-coding modules as discussed with reference to FIGS. 1B-1D.

RN 312 and/or wireless devices 301, 302, 304, 305, 306 are scheduled in SU/MU-MIMO mode based on, for example, MU-MIMO pairing criteria being met. For example, RN 312 and/or wireless devices 301, 302, 304, 305, 306 are classified into primary and candidate RN 308 and/or wireless devices 301, 304, 305, 306. For each PRB, DeNB 310 may select from the list of MU-MIMO candidates a best RN and/or wireless device to pair with primary RN and/or a primary wireless device 302. Because MU-MIMO performance relies on good RNs and/or wireless device pairing and/or co-scheduling at DeNBs, pairing decisions are made at DeNB 310 at every subframe, for example, every millisecond.

In an exemplary embodiment, DeNB 310 may exclude relay-capable wireless devices 305 and/or RN 312 for MU-MIMO pairing and transmit resources (e.g., the next available PRB and/or wireless spectrum) to excluded relay-capable wireless devices 305 and/or RN 312 using SU-MIMO. Non-relay-capable wireless devices, for example, wireless device 304, may be selected from the candidate list based on channel orthogonality and SINR meeting a set threshold. Wireless device 304 may be paired with non-relay-capable wireless device 302 for MU-MIMO transmissions. Scheduler 114, illustrated in FIG. 1A, and/or a scheduler module (not shown) of DeNB 310 may allocate resources (e.g., the next available PRB, wireless spectrum, etc.) to relay-capable wireless devices 305 and/or RN 312 using SU-MIMO based on, for example, capacity and transmission delay characteristics reported at DeNB 310 and can distribute resources via a scheduling algorithm. Scheduler 114 and/or a scheduler module (not shown) of DeNB 310 may allocate resources (e.g., the next available PRB, wireless spectrum, etc.) to paired non-relay-capable wireless devices 302, 304 using MU-MIMO based on, for example, channel orthogonality, SINR, and other secondary criterion and can distribute resources via a scheduling algorithm.

Figure 4:
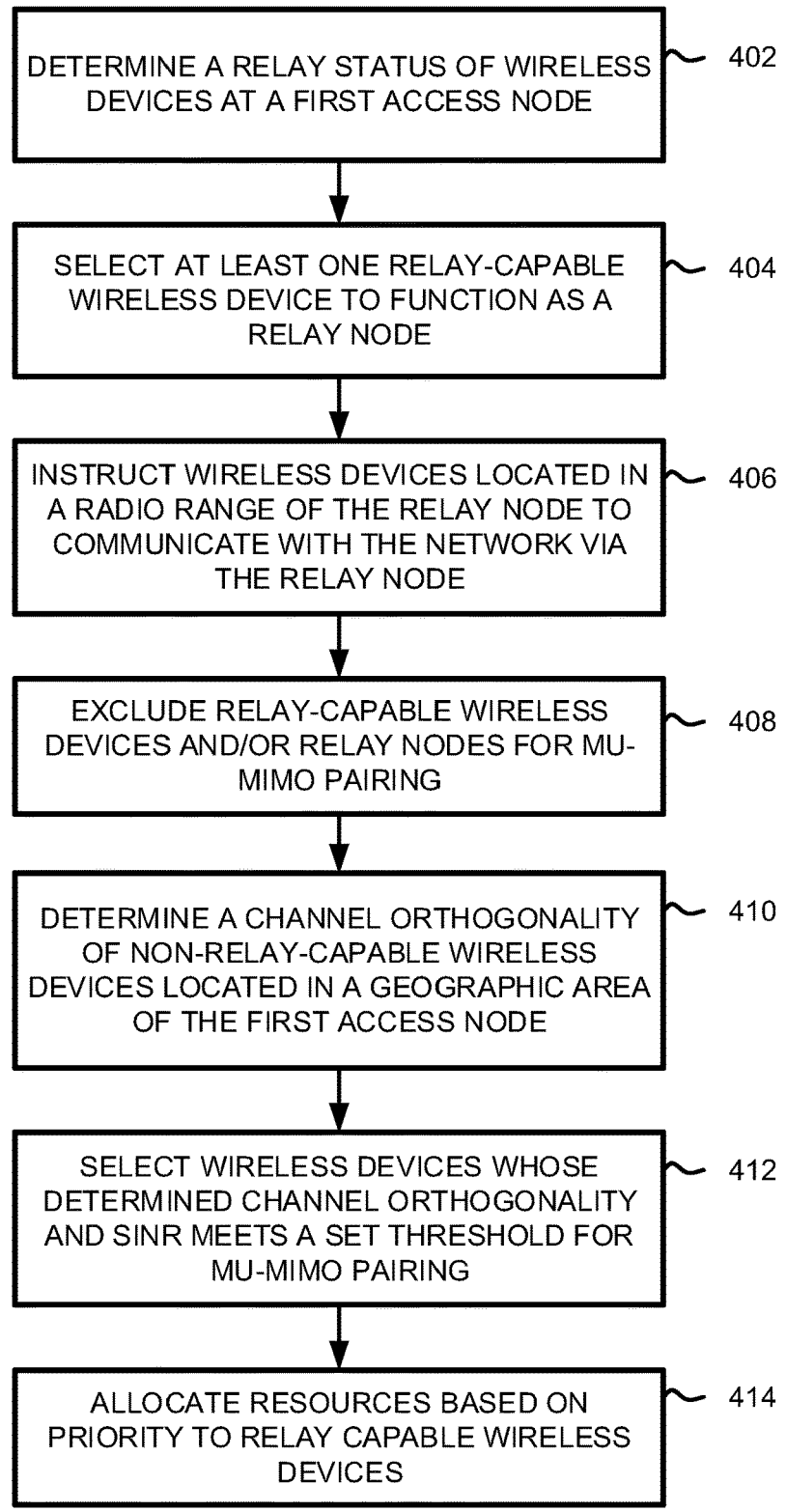
FIG. 4 illustrates another exemplary method for excluding RNs from MU-MIMO pairing.

FIG. 4 illustrates another exemplary method for excluding RNs for MU-MIMO pairing. The method will be discussed with reference to aspects of the exemplary communication system 100 illustrated in FIGS. 1A-1E, and the portion 300 of the exemplary communication system 100 illustrated in FIG. 3. In addition, although FIG. 4 depicts steps performed in a particular order for purposes of illustration and discussion, the method discussed herein is not limited to any particular arrangement. One skilled in the art, using the disclosures provided herein, will appreciate that various steps of the method can be omitted, rearranged, combined and/or adapted in various ways.

Referring to FIG. 4, at steps 402 and 404, a relay "status" of wireless devices operating in a geographic area of DeNBs operating in SU/MU-MIMO mode is determined; at least one relay-capable wireless device (including relay-capable mini-macros) is selected to function as a RN. Referring to FIG. 3, wireless devices 301, 306 operating at cell-edges, "hotspots," and/or coverage "holes" of a geographical area (not shown) of DeNB 310 may experience reduced channel capacity, e.g., low SINR levels and/or QoS degradation. DeNB 310 may select a relay-capable wireless device and/or mini-macros operating within the geographical area to function as a RN, for example, RN 312. DeNB 310 may select RN 312 from multiple relay-capable wireless devices based on collected RSSI and/or RF parameters reported at DeNBs 310 by, for example, RNs 312 and/or wireless device 305.

Once RN 312 has been selected, DeNB 310 may perform an attach procedure. For example, an RRC Connection setup may be performed between RN 312 and DeNB 310. RN 312 may transmit a RN capability indicator (e.g., which indicates a relay-capable "status" of RN 312) to DeNB 310 during the RRC Connection establishment. Based on the RN capability indicators, DeNBs 310 may establish interfaces, for example, S1 interfaces, with controller node 116, illustrated in FIG. 1A, for signaling support of RN 312. If controller node 116 is capable of supporting RN 312, controller node 116 may transmit a RN support message to DeNB 310 during the S1 interface setup and implement an OAM protocol to complete RN configuration. After configuration, DeNB 310 may initiate setup of bearers (e.g., S1/x2/Un bearers) for RN 312 and RN 312 may initiate setup of interfaces (e.g., S1, x2, Un, Uu interfaces) with DeNB 310. DeNB 310 may also initiate an RN reconfiguration procedure via RRC signaling for RN-specific parameters.

At step 406, DeNB 310 can instruct wireless devices located in a radio range of the selected RN to communicate with the communication network via the RN. For example, after the RN reconfiguration update procedure at step 404 is performed, DeNB 310 can update the PCI of RN 312 and instruct, for example, wireless devices 301, 306 operating within a radio range (not shown) of RN 312 to communicate over system 100, illustrated in FIG. 1A, via RN 312. For example, DeNB 310 may perform a handover of wireless devices 301, 306 from DeNB 310 to RN 312.

At step 408, DeNB 310 may exclude relay-capable wireless devices (including mini-macros) and/or RNs from MU-MIMO pairing. For example, DeNB 310 may be configured to detect a relay-connection between RN 312 and DeNB 310 and/or a relay-capability between relay-capable wireless device 305 and DeNB 310 based on a unique PLMN. DeNB 310 may exclude the detected relay-capable wireless devices 305 and/or RN 312 from MU-MIMO pairing and configure relay-capable wireless devices 305 and/or RN 312 for SU-MIMO mode.

At step 410, a channel orthogonality of non-relay-capable wireless devices (including mini-macros) located in a geographic area of an access node is determined. For example, DeNB 310 operating in SU/MU-MIMO mode may receive information from RN 312 and relay-capable wireless devices 305 (excluded from MU-MIMO pairing) and non-relay capable wireless devices 301, 302, 304, 306 located in a geographic area (not shown) of DeNB 310 including: RI and CQI. Based on the collected CQI's, DeNB 310 may select a correct MCS for the channel conditions. Combined with the MCS, CQI can be converted into, for example, an expected throughput. DeNB 310 may use this information to determine whether or not to implement SU/MU-MIMO mode and an amount of PRBs to allocate to RN 312, relay-capable wireless device 305, and/or wireless devices 301, 302, 304, 306. RN 312, relay-capable wireless device 305, and/or wireless devices 301, 302, 304, 306 may also analyze channel conditions and provide RI and PMI to DeNB 310. Based on the RI and PMI, RN 312, relay-capable wireless device 305, and/or wireless devices 301, 302, 304, 306 can provide a CQI to DeNB 310, i.e., instead of basing CQI on the SU/MU-MIMO operating mode at DeNB 310.

In an exemplary embodiment, non-relay-capable wireless device 304 is assigned a Precoder that is orthogonal to primary non-relay-capable wireless device 302. For example, DeNB 310 can pre-code reference signals, i.e., DM-RS, specific to non-relay-capable wireless device 304 for demodulation purposes on scheduled PRBs; DeNB 310 applies the pre-coding based on channel feedback received from non-relay-capable wireless device 304 including RI, CQI, and PMI. Optimal pre-coding for MU-MIMO mode at DeNB 310 may include DPC, user-scheduling, and power loading. Additional pre-coding techniques can include CI and/or RCI. Based on the channel orthogonality, DeNB 310 can generate a list of non-relay-capable wireless devices located in the geographic area (not shown) of DeNB 310 for pairing with primary non-relay-capable wireless device 302. The generated list may be stored at, for example, a memory module (not shown) or at storage 508 of processing node 500 illustrated in FIG. 5.

At step 412, non-relay-capable wireless devices whose determined channel orthogonality and SINR meets a set threshold are selected for MU-MIMO pairing. For MU-MIMO pairing, non-relay capable wireless devices 302 and 304 are scheduled for MU-MIMO pairing based on MU-MIMO pairing criteria being met. In an exemplary embodiment, wireless device 302 is classified as a primary wireless device (i.e., a wireless device scheduled for transmission using an SU-MIMO TD-FD PS scheme) and wireless device 304 is classified as a candidate (i.e., MU-MIMIO candidate). For each PRB, DeNB 310 selects from the list of candidates (e.g., non-relay-capable wireless device 301, 304, 306) a best candidate to pair with primary wireless device 302. For example, DeNB 310 may select any of wireless devices 301, 304, 306 for MU-MIMO pairing with primary wireless device 302 based on a channel orthogonality and SINR meeting a set threshold.

In other words, non-relay-capable wireless devices are prioritized over RNs for MU-MIMO pairing based on channel orthogonality and SINR. For example, DeNB 310 may prioritize wireless device 304 for pairing with primary wireless device 302 over relay-capable wireless device 305 and/or RN 312 based on a candidate having a highest metric (e.g., a metric based on a non-relay-capable status, channel orthogonality, SINR, or other secondary criterion). The secondary criterion may include: (i) not pairing RNs and/or relay-capable wireless devices if PRBs in a current TTI are enough to schedule RNs and/or relay-capable wireless devices without pairing; (ii) configure DeNB to calculate an expected cell throughput gain from pairing and, if no throughput gain is determined, then the selected relay-capable wireless devices and/or RNs are not paired; (iii) excluding HARQ re-transmission RNs and/or relay-capable wireless devices from pairing; (iv) requiring a higher priority for Non-GBR RNs and/or relay-capable wireless devices for pairing; (v) excluding RNs and/or relay-capable wireless devices using TTI bundling from pairing; (vi) selecting high-speed RNs and/or relay-capable wireless devices with low priority for pairing; and (vii) excluding TTI bundling RNs and/or relay-capable wireless devices located at cell-edges from pairing. If none of candidate non-relay capable wireless devices 301, 304, 306 meet the primary and/or secondary criterion, the primary non-relay-capable wireless device 302 may transmit in SU-MIMO mode. Alternatively, primary non-relay-capable wireless device 302 may be paired for MU-MIMO with, for example, a relay capable wireless device (including mini-macros) 305 or RN 312 based on channel orthogonality.

At step 414, resources are allocated to non-relay-capable wireless devices paired for MU-MIMO transmissions based on priority. For example, scheduler 114, illustrated in FIG. 1A, and/or a scheduler module (not shown) of DeNB 310 may allocate resources (e.g., the next available PRB, wireless spectrum, etc.) to MU-MIMO paired wireless devices 302, 304 and/or relay-capable wireless devices 305 and RN 312 using SU-MIMO mode based on, for example, capacity and transmission delay characteristics reported at DeNB 310. Resources may be distributed via a scheduling algorithm (e.g., proportional fairness, round robin, etc.). The scheduling algorithms may prioritize resource allocation based on the collected characteristics, "relay" status, and/or operating mode, i.e., SU/MU-MIMO mode, of DeNB 310, RN 312, relay-capable wireless device 305, and/or non-relay capable wireless devices 301, 302, 304, 306.

Figure 5:
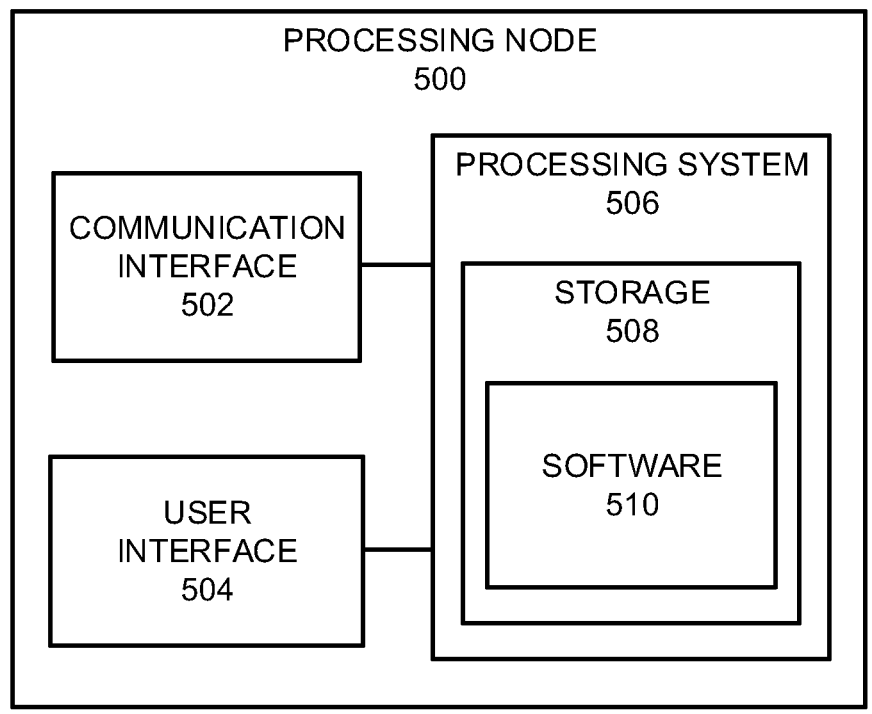
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include DeNBs 110, 112, 310, RNs 108, 312, scheduler 114, controller nodes 116, and gateway node 118. Processing node 500 can also be an adjunct or component of a network element, such as an element of DeNBs 110, 112, 310, RNs 108, 312, schedulers modules/nodes 114, controller node 116, and gateway node 118. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for enabling Multi-User Multiple-Input-Multiple-Output (MU-MIMO) pairing of wireless devices served by an access node, the method comprising:
   determining a channel orthogonality and Signal-to-Interference-Plus-Noise Ratio (SINR) of a plurality of wireless devices located in a geographic area served by the access node;
   excluding relay-capable wireless devices located in the geographic area from MU-MIMO pairing;
   selecting, from the plurality of wireless devices, non-relay capable wireless devices for MU-MIMO pairing, wherein the selected non-relay capable wireless devices are prioritized for MU-MIMO pairing based on a channel orthogonality and SINR meeting a set threshold; and
   selecting at least one relay node from the excluded relay-capable wireless devices for Single-User MIMO scheduling based on a reported Reference Signal Received Power ("RSRP"), Received Signal Strength Indicators ("RSSI"), and Radio Frequency ("RF") parameter.

2. The method of claim 1, wherein data packets are transmitted to the at least one relay node using a Modulation and Coding Scheme ("MCS") based on a Channel Quality Indicator ("CQI") reported by the at least one relay node.

3. The method of claim 2, wherein data packets are scheduled to the at least one relay node based a load at the relay node and an application profile of end-users.

4. The method of claim 1, wherein the at least one relay node is selected based on a loading condition.

5. The method of claim 4, wherein the loading condition is based on a number of end-users connected to the at least one relay node.

6. A system for enabling Multi-User Multiple-Input-Multiple-Output (MU-MIMO) pairing of wireless devices served by an access node, the system comprising:
   a processing node configured to:
      determine a channel orthogonality and Signal-to-Interference-Plus-Noise Ratio (SINR) of a plurality of wireless devices located in a geographic area served by the access node;
      exclude relay-capable wireless devices located in the geographic area from MU-MIMO pairing;
      select, from the plurality of wireless devices, non-relay capable wireless devices for MU-MIMO pairing, wherein the selected non-relay capable wireless devices are prioritized for MU-MIMO pairing based on a channel orthogonality and SINR meeting a set threshold; and
      select at least one relay node from the excluded relay-capable wireless devices for Single-User MIMO scheduling based on a reported Reference Signal Received Power ("RSRP"), Received Signal Strength Indicators ("RSSI"), and Radio Frequency ("RF") parameter.

7. The system of claim 6, wherein data packets are transmitted to the at least one relay node using a Modulation and Coding Scheme ("MCS") based on a Channel Quality Indicator ("CQI") reported by the at least one relay node.

8. The system of claim 7, wherein data packets are scheduled to the at least one relay node based a load at the relay node and an application profile of end-users.

9. The system of claim 6, wherein the at least one relay node is selected based on a loading condition.

10. The system of claim 9, wherein the loading condition is based on a number of end-users connected to the at least one relay node.

11. A method for selecting relay nodes for Single-User Multiple-Input-Multiple-Output (SU-MIMO), the method comprising:
   determining a channel orthogonality and Signal-to-Interference-Plus-Noise Ratio (SINR) of a plurality of wireless devices located in a geographic area of an access node;
   determining a relay-capable status of the plurality of wireless devices;
   excluding non-relay capable wireless devices located in the geographic area from SU-MIMO; and
   selecting, from the plurality of wireless devices, relay-capable wireless devices for SU-MIMO, wherein the selected relay-capable wireless devices are prioritized for SU-MIMO based on a channel orthogonality and SINR meeting a set threshold and wherein selecting the relay-capable wireless devices for SU-MIMO is based on a reported Reference Signal Received Power ("RSRP"), Received Signal Strength Indicators ("RSSI"), and Radio Frequency ("RF") parameter.

* * * * *